(12) United States Patent
Jang

(10) Patent No.: US 11,667,260 B2
(45) Date of Patent: Jun. 6, 2023

(54) AIRBAG DEVICE

(71) Applicant: HYUNDAI MOBIS CO., LTD., Seoul (KR)

(72) Inventor: Rae Ick Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 233 days.

(21) Appl. No.: 17/022,575

(22) Filed: Sep. 16, 2020

(65) Prior Publication Data

US 2021/0086717 A1 Mar. 25, 2021

(30) Foreign Application Priority Data

Sep. 20, 2019 (KR) .................... 10-2019-0115931

(51) Int. Cl.
*B60R 21/239* (2006.01)

(52) U.S. Cl.
CPC .... *B60R 21/239* (2013.01); *B60R 2021/2395* (2013.01)

(58) Field of Classification Search
CPC ........... B60R 2021/23386; B60R 2021/23388; B60R 2021/2395; B60R 21/205; B60R 21/2338; B60R 21/239
See application file for complete search history.

(56) References Cited

U.S. PATENT DOCUMENTS

| | | | | |
|---|---|---|---|---|
| 6,659,499 B2 * | 12/2003 | Jenkins | ............... | B60R 21/2338 280/739 |
| 7,017,945 B2 * | 3/2006 | DePottey | ................ | F42B 39/20 280/739 |
| 7,568,729 B2 * | 8/2009 | Schnieder | ........... | B60R 21/2338 280/739 |
| 7,614,654 B2 * | 11/2009 | Williams | ............ | B60R 21/2338 280/743.1 |
| 7,651,130 B2 * | 1/2010 | Bauberger | ............ | B60R 21/239 280/743.2 |
| 7,658,407 B2 * | 2/2010 | Ford | ..................... | B60R 21/239 280/739 |
| 7,748,738 B2 * | 7/2010 | Schneider | ........... | B60R 21/2346 280/740 |
| 7,770,926 B2 * | 8/2010 | Schneider | ............. | B60R 21/239 280/739 |
| 7,878,538 B2 * | 2/2011 | Abe | ...................... | B60R 21/239 280/739 |
| 7,931,299 B2 * | 4/2011 | McFadden | ............ | B60R 21/239 280/739 |

(Continued)

FOREIGN PATENT DOCUMENTS

JP 2012171408 A * 9/2012 ........... B60R 21/239

*Primary Examiner* — Laura Freedman
(74) *Attorney, Agent, or Firm* — NovoTechIP International PLLC

(57) ABSTRACT

An airbag device includes an airbag cushion unit inflatable with working gas introduced thereto, one or more variable vent units protruding outward from the airbag cushion unit and including a hollow portion communicating with an inner portion of the airbag cushion unit, and one or more tether units having one portion shaped to surround the variable vent unit and the other portion fixed to an outer portion of the airbag cushion unit, and configured to tighten and close the variable vent unit in response to the airbag cushion unit being inflated.

5 Claims, 5 Drawing Sheets

(56) References Cited

U.S. PATENT DOCUMENTS

| | | | |
|---|---|---|---|
| 7,938,444 B2* | 5/2011 | Williams | B60R 21/2338 280/739 |
| 8,186,714 B2* | 5/2012 | Schneider | B60R 21/276 280/739 |
| 8,191,925 B2* | 6/2012 | Williams | B60R 21/2338 280/739 |
| 8,262,130 B2* | 9/2012 | Fischer | B60R 21/2338 280/739 |
| 8,500,165 B2* | 8/2013 | Kwon | B60R 21/239 280/739 |
| 8,646,808 B2* | 2/2014 | Williams | B60R 21/239 280/739 |
| 8,955,634 B2* | 2/2015 | Bergenheim | B60R 21/2338 180/274 |
| 8,955,878 B2* | 2/2015 | Jang | B60R 21/239 280/736 |
| 9,815,429 B2* | 11/2017 | Schneider | B60R 21/206 |
| 10,336,283 B2* | 7/2019 | Rickenbach | B60R 21/233 |
| 2006/0192370 A1* | 8/2006 | Abe | B60R 21/01516 280/735 |

* cited by examiner

AIRBAG DEVICE

CROSS-REFERENCE TO RELATED APPLICATION

This application claims priority from and the benefit of Korean Patent Application No. 10-2019-0115931, filed on Sep. 20, 2019, which is hereby incorporated by reference for all purposes as if set forth herein.

BACKGROUND

Field

Exemplary embodiments of the present disclosure relate to an airbag device, and more particularly, to an airbag device in which the deployment pressure of an airbag cushion varies depending on the position of a passenger.

Discussion of the Background

In general, a vehicle is provided with airbags to protect passengers. Airbags are disposed in a variety of positions depending on the body portions of passengers. A front airbag is disposed in a front portion of a vehicle. When an impact is applied to the vehicle, gas is injected into the front airbag. The front airbag may be inflated with the gas supplied thereto so as to be deployed toward a passenger, thereby preventing the passenger from colliding with the vehicle body.

However, in the case of emergency braking of a vehicle, a passenger is moved forwards by the deceleration of the vehicle so as to be closer to an airbag that is being deployed, so that the passenger may be injured by the deploying force of the airbag. That is, in the emergency braking of the vehicle, after the head of the passenger has moved forwards and comes into contact with the airbag, the head or the neck of the passenger may be injured by the deployment of the airbag. Accordingly, in order to overcome the above-described problem, an improvement is required.

SUMMARY

Various embodiments are directed to an airbag device in which the deployment pressure of an airbag cushion varies depending on the position of a passenger.

In an embodiment, an airbag device includes: an airbag cushion unit inflatable with working gas introduced thereto; one or more variable vent units protruding outward from the airbag cushion unit and including a hollow portion communicating with an inner portion of the airbag cushion unit; and one or more tether units having one portion shaped to surround the variable vent unit and the other portion fixed to an outer portion of the airbag cushion unit, and configured to tighten and close the variable vent unit in response to the airbag cushion unit being inflated.

The airbag cushion unit may include: a pair of cushion sides connected to the variable vent units and facing each other; and a cushion body connecting the cushion sides.

The variable vent units may be located on both sides of the airbag cushion unit and provide ducts protruding outward from the airbag cushion unit.

The variable vent units may be made of cloth or a flexible material.

Each of the variable vent units may include: a vent body connected to the airbag cushion unit and having defined therein a passage through which the working gas moves; and an internal space portion provided inside the vent body and having defined therein a space in which the tether unit is disposed.

The airbag device tether unit may have one portion fixed to the vent body by moving along the internal space portion and the other portion fixed to a front lower portion of the airbag cushion unit.

The airbag device may further include guides fixed to outer portions of the airbag cushion unit while covering outer portions the tether unit to guide movements of the tether unit.

In the airbag device according to the present disclosure, the working gas is discharged through the variable vent units in the earlier deployment of the airbag cushion unit, whereas the variable vent units are closed in the later deployment of the airbag cushion unit. Accordingly, the deployment pressure of the airbag cushion unit may vary depending on the position of the passenger, thereby reducing the injury of the passenger.

In addition, since the variable vent units and the tether units are closed in positions outside the airbag cushion unit, instead of entering the airbag cushion unit, the deployment shape of the airbag cushion unit is constant and the internal volume of the airbag cushion unit is not changed, so that the airbag cushion unit may be deployed with the deployment pressure intended in the design.

DETAILED DESCRIPTION OF THE ILLUSTRATED EMBODIMENTS

Figure 1:
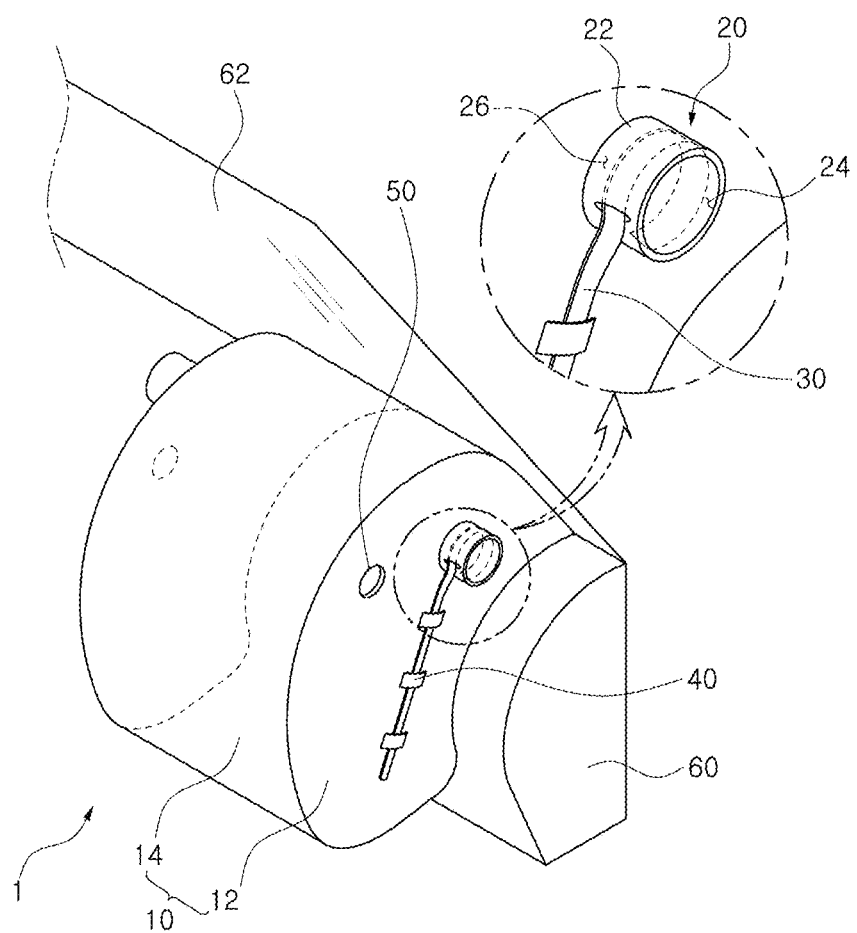
FIG. 1 is a perspective view illustrating a deployment state of an airbag device according to an embodiment of the present disclosure.

Hereinafter, an airbag device according to embodiments of the present disclosure will be described with reference to the accompanying drawings through various exemplary embodiments. The thicknesses of lines or the sizes of components illustrated in the drawings may be exaggerated for clarity and convenience of explanation.

In addition, the terms used herein are defined in consideration of functions thereof in the present disclosure, but may vary depending on the intentions of users or operators, or practice. Therefore, the terms shall be defined on the basis of the description throughout the specification.

Figure 2:
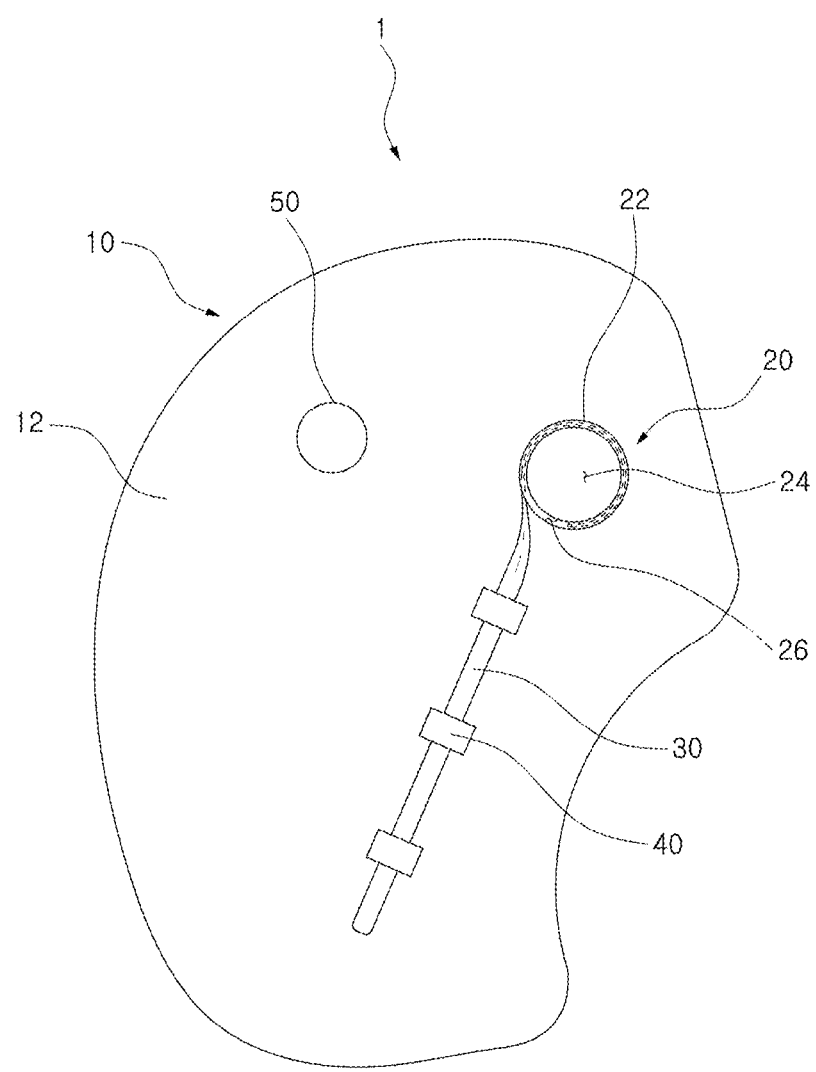
FIG. 2 is a front view illustrating the airbag device according to an embodiment of the present disclosure.
Figure 3:
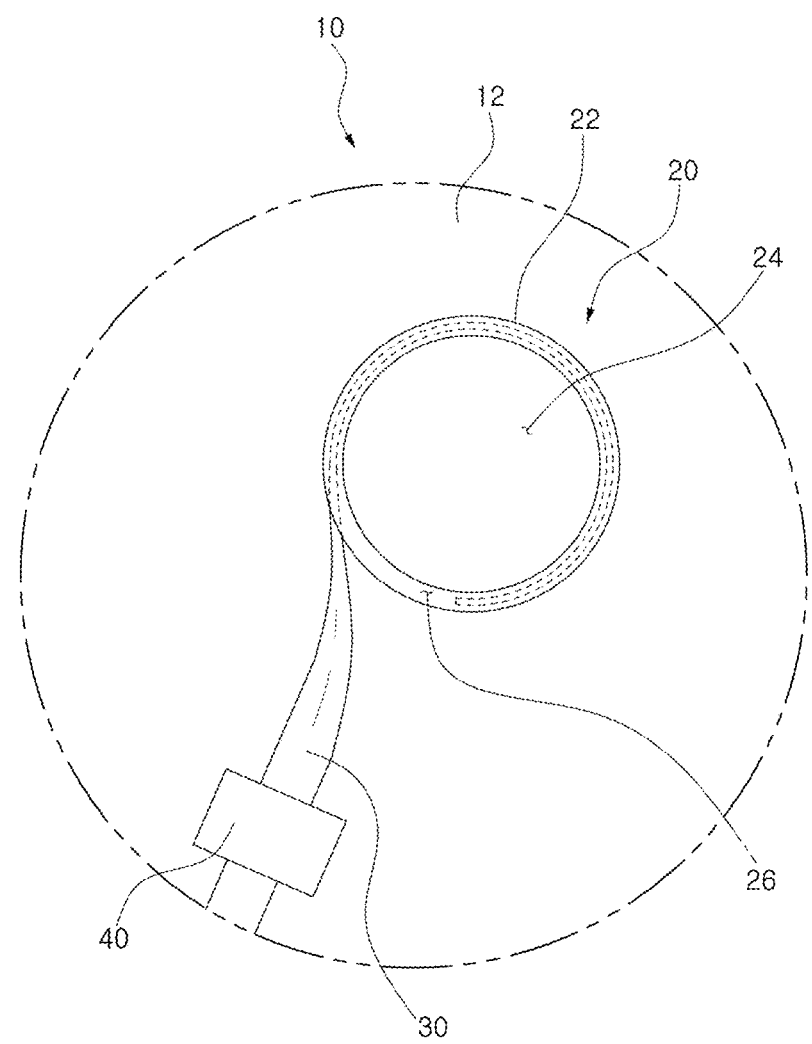
FIG. 3 is a front view illustrating an opened state of a variable vent unit of the airbag device according to an embodiment of the present disclosure.
Figure 4:
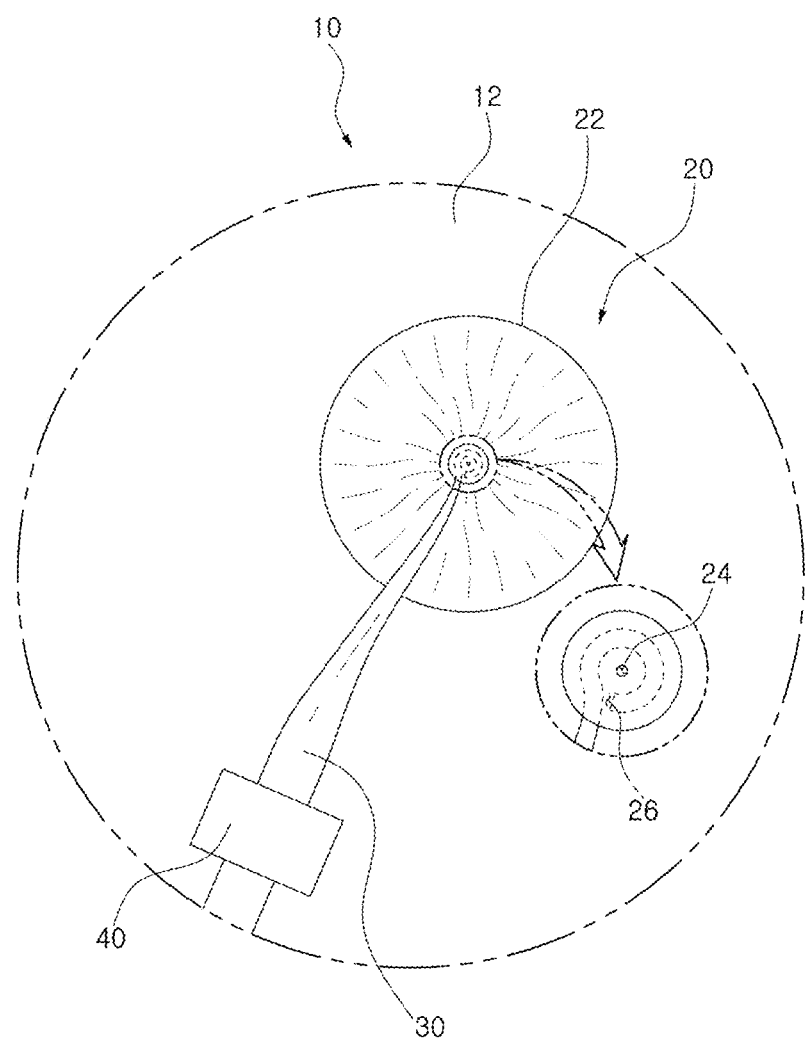
FIG. 4 is a front view illustrating a closed state of the variable vent unit of the airbag device according to an embodiment of the present disclosure.
Figure 5:
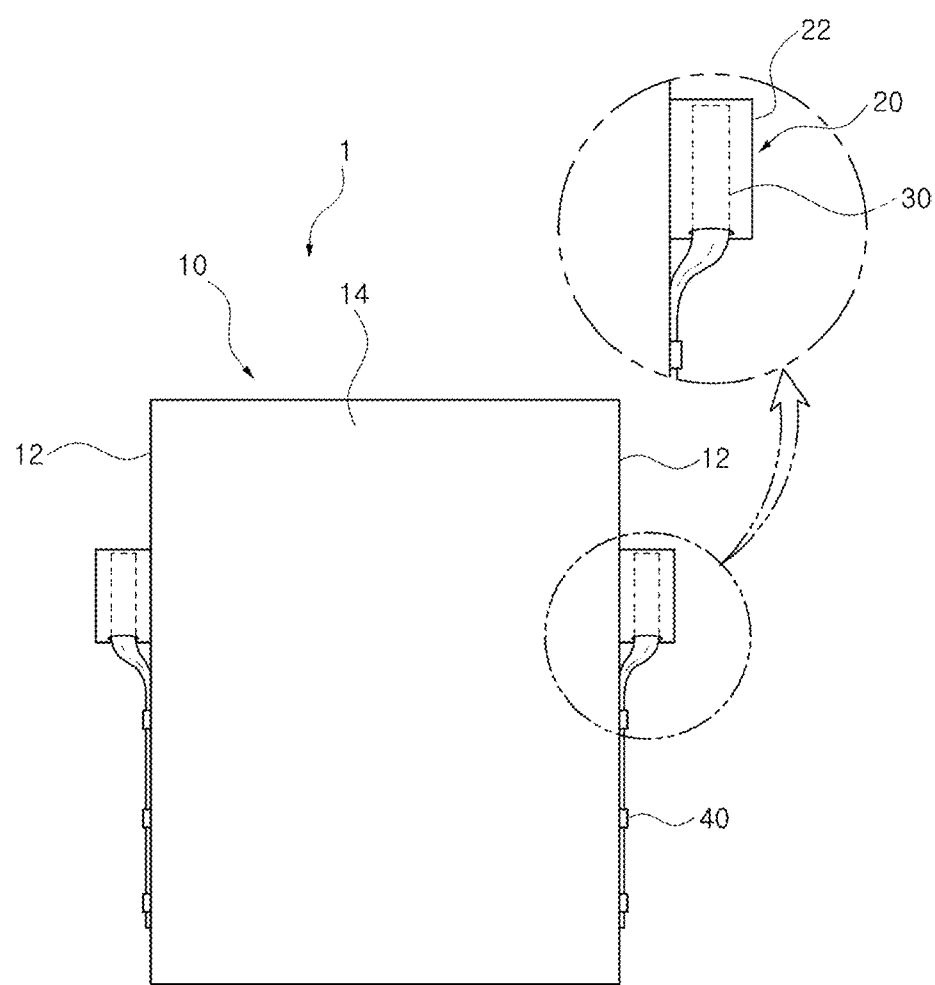
FIG. 5 is a side view illustrating the airbag device according to an embodiment of the present disclosure.

FIG. 1 is a perspective view illustrating a deployment state of an airbag device according to an embodiment of the present disclosure, FIG. 2 is a front view illustrating the airbag device according to an embodiment of the present disclosure, FIG. 3 is a front view illustrating an opened state of a variable vent unit of the airbag device according to an embodiment of the present disclosure, FIG. 4 is a front view illustrating a closed state of the variable vent unit of the airbag device according to an embodiment of the present disclosure, and FIG. 5 is a side view illustrating the airbag device according to an embodiment of the present disclosure.

As illustrated in FIGS. 1 to 5, an airbag device 1 according to an embodiment of the present disclosure includes an airbag cushion unit 10 inflatable with working gas introduced thereto, variable vent units 20 protruding outward from the airbag cushion unit 10 and provided with a hollow portion 24 communicating with the inside of the airbag cushion unit 10, and tether units 30 each having one portion shaped to surround the corresponding variable vent unit 20 and the other portion fixed to an outer portion of the airbag cushion unit 10, and configured to tighten and close the variable vent units 20, respectively, in response to the airbag cushion unit 10 being inflated.

The airbag cushion unit 10 may be modified to a variety of shapes without departing from the technical spirit that the airbag cushion unit is inflated with the working gas introduced thereto. The airbag cushion unit 10 according to an embodiment includes a pair of cushion sides 12 connected to the variable vent units 20 and facing each other and a cushion body 14 connecting the cushion sides 12.

The airbag device 1 disposed in front of the front passenger seat is deployed through a space defined between a dashboard 60 and a windshield 62.

When the working gas is introduced to the airbag cushion unit 10, the airbag cushion unit 10 is inflated to protect a passenger seated in the front passenger seat. The airbag cushion unit 10 includes the pair of cushion sides 12 and the single cushion body 14, and is fabricated from three panels. That is, the airbag cushion unit 10 includes the cushion body 14 inflatable to be deployed and come into contact with the passenger and the pair of cushion sides 12 connected to both sides of the cushion body 14 by sewing.

The airbag cushion unit 10 is connected to an inflator serving as a gas generator, and is deployed when the working gas generated by the inflator is introduced thereto in the case of a car crash.

However, in a case in which the passenger seated in the front passenger seat is in a forwardly-offset position or the passenger is seated in the front passenger seat moved forward, when the airbag cushion unit 10 is inflated, the distance between the passenger seated in the front passenger seat and the airbag cushion unit 10 is extremely close, such that the passenger may be injured by an excessive deployment pressure of the airbag cushion unit 10.

In order to prevent the passenger from being injured by the excessive deployment pressure of the airbag cushion unit 10, each of the cushion sides 12 of the airbag cushion unit 10 is provided with a vent hole 50 through which the working gas introduced into the airbag cushion unit 10 is discharged. However, when the passenger is in a normal position, an excessive amount of the working gas is discharged through the vent holes 50 and the variable vent units 20. In this case, the deployment pressure of the airbag cushion unit 10 may be excessively reduced, so that the passenger in the normal position may not be protected with an appropriate pressure.

In this regard, the airbag device 1 according to an embodiment of the present disclosure further includes the variable vent units 20, the tether units 30, and guides 40 in order to adjust the amount of the working gas discharged from the airbag cushion unit 10 depending on the position of the passenger.

The variable vent units 20 may be modified to a variety of shapes without departing from the technical spirit that the variable vent units protrude outward from the airbag cushion unit 10 and are provided with the hollow portions 24 communicating with the inside of the airbag cushion unit 10. Each of the variable vent units 20 according to an embodiment includes a vent body 22 and an internal space portion 26. The vent body 22 is connected to the airbag cushion unit 10 and has defined therein a passage through which the working gas moves. The internal space portion 26 is provided inside the vent body 22 and has defined therein a space in which the corresponding tether unit 30 is disposed.

The variable vent units 20 are made of cloth or a flexible material and are connected to outer portions of the cushion sides 12 by sewing, such that the variable vent units 20 allow the gas introduced to the inside of the airbag cushion unit 10 to be discharged therethrough. In addition, the variable vent units 20 are located on both sides of the airbag cushion unit 10 to form ducts protruding outward from the airbag cushion unit 10.

The vent body 22 is a duct with the hollow portion 24 defined therein, and the internal space portion 26 in which the strip-shaped tether unit 30 is located is provided inside the vent body 22. The tether unit 30, inserted into the internal space portion 26 from outside the cylindrical vent body 22, extends in a shape surrounding the vent body 22 and is fixed to the inner portion of the vent body 22.

Thus, when the tether unit 30 is pulled, the vent body 22 is tightened, thereby closing the hollow portion 24 serving as a passage through which the working gas moves.

Each of the tether units 30 may be modified to a variety of shapes without departing from the technical spirit that one portion thereof is shaped to surround the corresponding variable vent unit 20 and the other portion thereof is fixed to the outer portion of the airbag cushion unit 10, such that the tether units tighten and close the variable vent units 20 in response to the airbag cushion unit 10 being inflated. In the tether unit 30 according to an embodiment, one portion is fixed to the vent body 22 by moving along the internal space portion 26, and the other portion is fixed to the front lower portion of the airbag cushion unit 10.

The tether units 30 are disposed outside the airbag cushion unit 10 and tighten and close the variable vent units 20 in response to the airbag cushion unit 10 being inflated. In a position folded on the outer portion of the airbag cushion unit 10, the tether units 30 remain loose. When the airbag cushion unit 10 is inflated with the working gas introduced into the airbag cushion unit 10, the tether units 30 is moved along with the airbag cushion unit 10, thereby being tensed.

Thus, the tether units 30 are tensed in response to the inflation of the airbag cushion unit 10, thereby pulling the variable vent units 20, so that the variable vent units 20 are tightened and closed by the tether units 30. Accordingly, the working gas is not discharged through the variable vent units 20, but is only discharged through the vent holes 50.

The guides 40 may be modified to a variety of shapes without departing from the technical spirit that the guides are fixed to outer portions of the airbag cushion unit 10 while covering outer portions of the tether units 30 and guide the movement of the tether units 30. The guides 40 according to an embodiment are connected to the cushion sides 12, with both ends thereof being sewed to outer portions of the cushion sides 12, while covering the tether units 30, and thus guide the movement of the tether units 30.

In addition, the variable vent units 20 are tightened by the tether units 30, so that the variable vent units 20 are closed in positions outside the airbag cushion unit 10, instead of entering the airbag cushion unit 10. Thus, compared to a method in which the variable vent units 20 are closed by entering the airbag cushion unit 10, the deployment shape of the airbag cushion unit 10 is constant and the internal volume of the airbag cushion unit 10 is not changed, so that the airbag cushion unit 10 may be deployed with the deployment pressure consistent with the intention of design.

Hereinafter, the operational states of the airbag device 1 according to an embodiment of the present disclosure will be described in detail with reference to the accompanying drawings.

The airbag cushion unit 10 is stowed into a housing in a state in which the airbag cushion unit 10 is flattened and folded a plurality of times, and is connected to the inflator. In this state, in the case of a car crash, the inflator generates the working gas, which is then introduced to the airbag cushion unit 10.

When the gas is introduced to the airbag cushion unit 10, the airbag cushion unit 10 starts to be deployed while being inflated, so that the variable vent units 20 are also deployed and opened.

The airbag cushion unit 10 is further inflated by continuous introduction of the working gas, and the vent holes 50 are opened, so that the working gas is discharged through the variable vent units 20 and the vent holes 50.

As the airbag cushion unit 10 is further inflated to a state close to the maximum inflated state, the tether units 30 are tensed and start to tighten the variable vent units 20.

When the airbag cushion unit 10 is completely inflated and reaches the passenger in the normal position, the variable vent units 20 are completely tightened and closed by the tether units 30, so that the working gas is only discharged through the vent holes 50.

Here, the variable vent units 20 are tightened by the tether units 30 located outside the airbag cushion unit 10, thereby being closed in positions outside the airbag cushion unit 10, instead of entering the airbag cushion unit 10.

As described above, according to the present disclosure, the working gas is discharged through the variable vent units 20 in the earlier deployment of the airbag cushion unit 10, whereas the variable vent units 20 are closed in the later deployment of the airbag cushion unit 10. Accordingly, the deployment pressure of the airbag cushion unit 10 may vary depending on the position of the passenger, thereby reducing the injury of the passenger. In addition, since the variable vent units 20 and the tether units 30 are closed in positions outside the airbag cushion unit 10, instead of entering the airbag cushion unit 10, the deployment shape of the airbag cushion unit 10 is constant and the internal volume of the airbag cushion unit 10 is not changed, so that the airbag cushion unit 10 may be deployed with the deployment pressure intended in the design. In addition, when the passenger is seated relatively close to the airbag cushion unit 10, the working gas is discharged from the airbag cushion unit 10 through the open variable vent units 20. Thus, even when the distance between the airbag cushion unit 10 and the passenger is extremely close, the passenger may be prevented from being injured by an excessive deployment pressure of the airbag cushion unit 10. In addition, since the variable vent units 20 are closed when the passenger is in the normal position, the working gas may be prevented from being discharged from the airbag cushion unit 10 through the variable vent units 20, thereby maintaining the airbag cushion unit 10 in an appropriate pressure. Accordingly, the passenger seated in the normal position may be safely protected.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag device comprising:
   an airbag cushion having an inner space and first and second side portions, the first and second side portions respectively having first and second exterior surfaces, wherein, when the airbag cushion is inflated by a gas introduced to the inner space of the airbag cushion, the first and second exterior surfaces respectively face in mutually opposed directions, each of the first and second exterior surfaces having first, second and third portions spaced apart from each other,
   wherein the first side portion comprises:
      a first vent hole positioned at the first portion of the first exterior surface and exposing the inner space of the airbag cushion;
      a first variable vent protruding outwardly from the second portion of the first exterior surface of the airbag cushion and having a hollow portion connected to the inner space of the airbag cushion;
      a first tether extending entirely on the first exterior surface of the airbag cushion and having a first end portion surrounding the first variable vent and a second end portion coupled to the third portion of the first exterior surface of the airbag cushion; and
      a plurality of first guides coupled to the first exterior surface of the airbag cushion and spaced apart from each other, the plurality of first guides configured to guide a movement of the first tether on the first exterior surface of the airbag cushion,
   wherein the second side portion comprises:
      a second vent hole positioned at the first portion of the second exterior surface and exposing the inner space of the airbag cushion;
      a second variable vent protruding outwardly from the second portion of the second exterior surface of the airbag cushion and having a hollow portion connected to the inner space of the airbag cushion;
      a second tether extending entirely on the second exterior surface of the airbag cushion and having a first end portion surrounding the second variable vent and a second end portion coupled to the third portion of the second exterior surface of the airbag cushion; and
      a plurality of second guides coupled to the second exterior surface of the airbag cushion, spaced apart from each other, wherein the plurality of second guides configured to guide a movement of the second tether on the second exterior surface of the airbag cushion, and
   wherein the first and second tethers extend parallel to each other and are configured to tighten and close the first and second variable vents, respectively, when the airbag cushion is inflated and reaches a passenger in a normal position such that gas introduced to the inner space of the airbag cushion is discharged through the first and second vent holes when the inflated airbag cushion reaches the passenger in the normal position.

2. The airbag device of claim 1, wherein the airbag cushion further includes a body portion extending between the first and second side portions.

3. The airbag device of claim 1, wherein the first and second variable vents comprise cloth or a flexible material.

4. The airbag device of claim 1, wherein each of the first and second variable vents includes:

a vent body connected to the airbag cushion and having a passage through which the gas moves; and an internal space portion provided within the vent body and having a space through which the first end portion of the first or second tether extends.

5. The airbag device of claim 1, wherein the first portion of the first and second exterior surfaces is higher than the second portion of the first and second exterior surfaces when the airbag cushion is inflated.

\* \* \* \* \*